United States Patent
Ge et al.

(10) Patent No.: US 12,221,244 B2
(45) Date of Patent: Feb. 11, 2025

(54) MACHINE VISION-BASED SHEET LABELING METHOD AND APPARATUS, DEVICE AND STORAGE MEDIUM

(71) Applicant: Hangzhou Baizijian Technology Co., Ltd, Hangzhou (CN)

(72) Inventors: Ming Ge, Hangzhou (CN); Jingxue Shen, Hangzhou (CN); Jiang Wei, Hangzhou (CN); Junwei Xu, Hangzhou (CN)

(73) Assignee: Hangzhou Baizijian Technology Co., LTD, Hangzhou (CN)

( * ) Notice: Subject to any disclaimer, the term of this patent is extended or adjusted under 35 U.S.C. 154(b) by 0 days.

(21) Appl. No.: 18/737,279

(22) Filed: Jun. 7, 2024

(65) Prior Publication Data
US 2024/0409264 A1    Dec. 12, 2024

(30) Foreign Application Priority Data

Jun. 7, 2023  (CN) .......................... 202310666092.6

(51) Int. Cl.
*G06T 7/73*     (2017.01)
*B65C 9/18*     (2006.01)
(Continued)

(52) U.S. Cl.
CPC .................. *B65C 9/40* (2013.01); *B65C 9/18* (2013.01); *B65C 9/46* (2013.01); *B65H 9/20* (2013.01);
(Continued)

(58) Field of Classification Search
None
See application file for complete search history.

(56) References Cited

U.S. PATENT DOCUMENTS 10,109,045 B2 * 10/2018 Kobayashi ......... G01N 21/8901
2017/0307543 A1 * 10/2017 Kashu .................... B65H 18/08
(Continued)

FOREIGN PATENT DOCUMENTS

| CN | 102007367 A | 4/2011 |
| CN | 107402221 A | 11/2017 |

(Continued)

OTHER PUBLICATIONS

Yang Xiao; First Office Action for CN Application No. 202310666092. 6; Jul. 19, 2023; 12 pages; The State Intellectual Property Office of People's Republic of China.

(Continued)

*Primary Examiner* — Ian L Lemieux
(74) *Attorney, Agent, or Firm* — William P. Jensen; Crain Caton & James P.C.

(57) ABSTRACT

A machine vision-based sheet defect labeling method and apparatus, a device and a medium are provided. The method includes: performing a defect inspection on a target sheet conveyed to a preset defect inspection position, specifically, the target sheet continues to be conveyed towards a preset labeling position after passing the preset defect inspection position by being conveyed; generating a defect label of the target sheet when a defect present in the target sheet is determined, specifically, the defect label carries defect information represented by a two-dimensional barcode symbol including discontinuous dots; and labeling the defect of the target sheet at the preset labeling position with the defect label of the target sheet.

14 Claims, 7 Drawing Sheets

(51) Int. Cl.
  *B65C 9/40* (2006.01)
  *B65C 9/46* (2006.01)
  *B65H 9/20* (2006.01)
  *G06T 7/00* (2017.01)
(52) U.S. Cl.
  CPC .............. *G06T 7/001* (2013.01); *G06T 7/74* (2017.01); *B65C 2009/405* (2013.01); *B65H 2301/5111* (2013.01); *B65H 2553/51* (2013.01); *G06T 2207/30108* (2013.01)

(56) References Cited

U.S. PATENT DOCUMENTS

| | | | |
|---|---|---|---|
| 2022/0198228 A1 | | 6/2022 | Kuo et al. |
| 2022/0198633 A1* | | 6/2022 | Kuo ..................... G06T 7/001 |
| 2023/0061439 A1* | | 3/2023 | Sun ..................... G06T 7/001 |
| 2023/0117656 A1 | | 4/2023 | Sun et al. |
| 2024/0199267 A1* | | 6/2024 | Ma ..................... G06T 7/13 |

FOREIGN PATENT DOCUMENTS

| | | | | |
|---|---|---|---|---|
| CN | 107870172 A | * | 4/2018 | ......... G01N 21/8851 |
| CN | 110308156 A | | 10/2019 | |
| CN | 111754470 A | | 10/2020 | |
| CN | 212048218 U | | 12/2020 | |
| CN | 113284094 A | | 8/2021 | |
| CN | 113570601 A | | 10/2021 | |
| CN | 113697228 A | | 11/2021 | |
| CN | 113900935 A | | 1/2022 | |
| CN | 115495608 A | | 12/2022 | |
| CN | 115608643 A | | 1/2023 | |
| CN | 115690097 A | | 2/2023 | |
| CN | 115984268 A | | 4/2023 | |
| CN | 116118363 A | | 5/2023 | |
| JP | 3974400 B2 | * | 9/2007 | |
| JP | 2013111816 A | | 6/2013 | |
| JP | 5659814 B2 | * | 1/2015 | |
| KR | 20120105211 A | | 9/2012 | |

OTHER PUBLICATIONS

Phan, Viet Anh. "Learning Stretch-Shrink Latent Representations With Autoencoder and K-Means for Software Defect Prediction." IEEE Access 10 (2022); 11 pages.

Guo Kang, et al; "Research on the curved surface character detection system based on machine vision"; Modern Manufacturing Engineering; Dec. 2016; 6 pages.

Zhichang Huang et al; "Self-regulation system for height of label-affixing machine of cigarette boxes"; combined machine tools and automated processing technology; 2004; pp. 68-70.

Yang Xiao; Notification to Grant CN Application No. 202310666092.6; Aug. 29, 2023; 11 pages; The State Intellectual Property Office of People's Republic of China (includes granted claims and translations).

* cited by examiner

MACHINE VISION-BASED SHEET LABELING METHOD AND APPARATUS, DEVICE AND STORAGE MEDIUM

CROSS-REFERENCE TO RELATED APPLICATION

This application claims priority to Chinese patent application No. 202310666092.6 filed with the China National Intellectual Property Administration (CNIPA) on Jun. 7, 2023, the disclosure of which is incorporated herein by reference in its entirety.

TECHNICAL FIELD

The present disclosure relates to the technical field of machine vision and sheet inspection, and in particular to a machine vision-based sheet defect labeling method, a machine vision-based sheet defect labeling apparatus, a device and a storage medium.

BACKGROUND

In sheet production lines, various defects may occur due to the large number of processing steps, complex processing procedures and the increasing requirements for appearance. To this end, it is required to perform real-time defect inspection on the sheets on the production line. When defects are found by inspection on the sheets, marks will be attached at the defect positions to indicate that defects occur on the sheets on the production line. However, for the marks at the defect positions, simple colors and shapes are used to distinguish different defects, which leads to unclear defects on the sheets on the production line. Most of the time, it requires workers with certain experience to identify the defects well, resulting in low efficiency in sheet defect identification and analysis and low labeling efficiency.

SUMMARY

Embodiments of the present disclosure provide a machine vision-based sheet defect labeling method and an apparatus, a device and a storage medium, so as to solve the problem of low efficiency in sheet defect identification and analysis caused by unclear defect information when different defects are distinguished by colors and shapes.

Embodiments of the present disclosure provide a machine vision-based sheet defect labeling method, the method includes the steps below.

A defect inspection is performed on a target sheet conveyed to a preset defect inspection position. The target sheet continues to be conveyed towards a preset labeling position after passing the preset defect inspection position by being conveyed.

A defect label of the target sheet is generated when a defect present in the target sheet is determined. The defect label carries defect information represented by a two-dimensional barcode symbol including discontinuous dots.

The defect of the target sheet is labeled at the preset labeling position with the defect label of the target sheet.

Embodiments of the present disclosure further provide a machine vision-based sheet defect labeling apparatus, the apparatus includes a target sheet inspection module, a defect label determination module and a labeling module.

The target sheet inspection module is configured to perform a defect inspection on a target sheet conveyed to a preset defect inspection position. The target sheet continues to be conveyed towards a preset labeling position after passing the preset defect inspection position by being conveyed.

The defect label determination module is configured to generate a defect label of the target sheet when a defect present in the target sheet is determined. The defect label carries defect information represented by a two-dimensional barcode symbol including discontinuous dots.

The labeling module is configured to label the defect of the target sheet at the preset labeling position with the defect label of the target sheet.

Embodiments of the present disclosure further provide an electronic device, the electronic device includes: at least one processor; and a memory communicatively connected to at least one processor. The memory stores a computer program executable by the at least one processor, the computer program is executed by the at least one processor, to enable the at least one processor to execute the machine vision-based sheet defect labeling method according to any embodiment of the present disclosure.

Embodiments of the present disclosure further provide a computer-readable storage medium is provided, which stores a computer instruction, and the computer instruction is used to cause a processor to implement the machine vision-based sheet defect labeling method according to any embodiment of the present disclosure when the computer instruction is executed by the processor.

In the technical solutions of embodiments of the present disclosure, a defect inspection is performed on a target sheet conveyed to a preset defect inspection position. The target sheet continues to be conveyed towards a preset labeling position after passing the preset defect inspection position by being conveyed. In this step, the inspection on whether a defect is present in a target sheet is implemented by means of a machine visual inspection device, which improves the accuracy of labeling. A defect label of the target sheet is generated when the defect present in the target sheet is determined. The defect label carries defect information represented by a two-dimensional barcode symbol including discontinuous dots. With the above defect label generation method, the defect label is obtained by generating the two-dimensional barcode symbol from the defect information, thereby satisfying the marking requirements for including more data, being more efficient and more accurate in the operation of a high-speed sheet production line, and implementing the recording of information and tracking of quality without being restricted by personnel, space and time. The defect of the target sheet is labeled at the preset labeling position with the defect label of the target sheet, and the labeling is performed at the preset labeling position, which solves the problem of untimely labeling caused by labeling at the defect inspection position. Therefore, in the present disclosure, by using the machine visual inspection device to inspect the defect information of the sheets, and generating the defect information obtained by inspection into the two-dimensional barcode symbol, the problem of low efficiency in sheet defect identification and analysis caused by unclear defect information is solved, thereby improving the defect recognition and analysis efficiency.

It should be understood that the content described in this section is not intended to identify key or important features of the embodiments of the present disclosure, nor is it intended to limit the scope of the present disclosure. Other features of the present disclosure will become readily understood from the following description.

BRIEF DESCRIPTION OF DRAWINGS

In order to more clearly illustrate the technical solutions in the embodiments of the present disclosure, the drawings required for use in the description of the embodiments are briefly introduced hereinafter. Apparently, the drawings described hereinafter are only some embodiments of the present disclosure. For the person of ordinary skills in the art, other drawings can be obtained based on these drawings without creative work.

DETAILED DESCRIPTION

In order to enable the person skilled in the art to better understand the solutions of the present disclosure, the technical solutions in the embodiments of the present disclosure will be clearly and completely described hereinafter in conjunction with the drawings in the embodiments of the present disclosure. Apparently, the described embodiments are only embodiments of a part of the present disclosure, rather than all embodiments. Based on the embodiments of the present disclosure, all other embodiments obtained by the person of ordinary skills in the art without making any creative efforts should fall within the scope of the present disclosure.

It is to be noted that the terms "first", "second" and the like in the description, claims and drawings of the present application are intended to distinguish between similar objects and are not necessarily used to describe a particular order or sequence. It is to be understood that the data used in this way is interchangeable where appropriate so that the embodiments of the present disclosure described herein may also be implemented in a sequence not illustrated or described herein. Furthermore, terms such as "include", "have"; and any deformation thereof, are intended to cover non-exclusive inclusion, e.g., a process, method, system, product, or device including a series of steps or units is not necessarily limited to those steps or units expressly listed, but may include other steps or units not expressly listed or inherent to such process, method, system, product or device.

Figure 1:
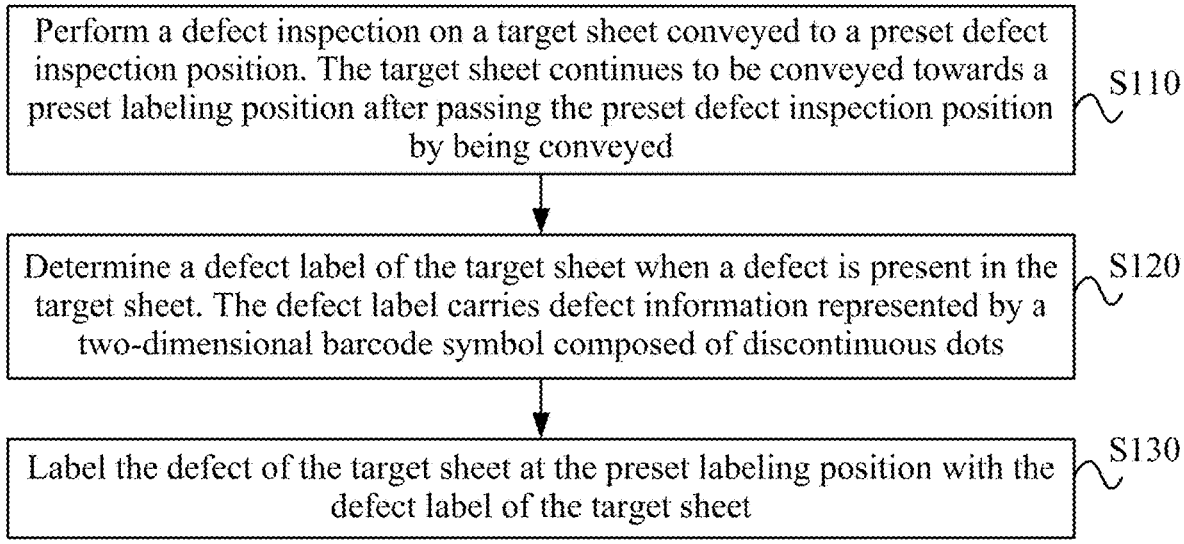
FIG. 1 is a flow chart of a machine vision-based sheet defect labeling method according to an embodiment of the present disclosure.

FIG. 1 is a flow chart of a machine vision-based sheet defect labeling method according to an embodiment of the present disclosure. The embodiment of the present disclosure is applicable to the situation where defective sheets inspected need to be quickly labeled on a sheet production line. The method may be executed by a machine vision-based sheet defect labeling apparatus. The machine vision-based sheet defect labeling apparatus may be implemented by hardware and/or software. The machine vision-based sheet defect labeling apparatus may be configured in any electronic device with network communication function, and the electronic device may be a programmable logic controller (PLC), etc. As shown in FIG. 1, the machine vision-based sheet defect labeling method of this embodiment may include the steps below.

In S110, a defect inspection is performed on a target sheet conveyed to a preset defect inspection position. The target sheet continues to be conveyed towards a preset labeling position after passing the preset defect inspection position by being conveyed.

The target sheet may be a single sheet obtained by cutting, for example, the target sheet may be a single square sheet of 40 cm×40 cm or a single rectangular sheet of 40 cm×20 cm, and the cutting size and shape are not limited. The target sheet may be a sheet portion of a single sheet obtained by cutting. The target sheet may also be a sheet portion of a sheet that has been unrolled from a roll of sheets.

The preset defect inspection position may be a preconfigured position for performing defect inspection on a target sheet being conveyed. When the target sheet is conveyed to the preset defect inspection position, defect inspection in the target sheet may be initiated.

The preset labeling position may be a preconfigured position for labeling a defective target sheet when a defect is present in the target sheet. When the defective target sheet is conveyed to the preset labeling position, defect labeling for the target sheet may be initiated.

The target sheet may be conveyed on a production line corresponding to a preset defect inspection position and a preset labeling position. When the target sheet is conveyed to the preset defect inspection position, defect inspection is performed in the target sheet. After the target sheet is conveyed to the preset defect inspection position, the target sheet will continue to be conveyed and moved to the preset labeling position, so that the target sheet is conveyed to the preset labeling position to label the defective target sheet.

In an embodiment, the defect inspection being performed on a target sheet conveyed to the preset defect inspection position includes as follows.

A target sheet image of the target sheet conveyed to the preset defect inspection position is obtained by performing image acquisition toward the preset defect inspection position with a visual inspection device; and the defect inspection is performed in the target sheet based in the target sheet image. When the target sheet is conveyed to the preset defect inspection position, the target sheet enters the visual inspection range of the visual inspection device. At this time, the visual inspection device may capture the image of the target sheet entering its own visual inspection range to obtain the target sheet image. Further, the acquired target sheet image of the target sheet may be used for defect inspection and analysis, and defect information on whether a defect is present in the target sheet and capable of improving defect analysis efficiency of the defective target sheet when a defect is present in the target sheet is acquired through the defect inspection.

In the way described above, target sheet features can be extracted from the target sheet image, and the target sheet features are used to perform real-time inspection on whether a defect is present in the target sheet, thereby achieving high inspection accuracy of defects of the target sheet.

In S120, a defect label of the target sheet is determined when a defect is present in the target sheet is determined. The defect label carries defect information represented by a two-dimensional barcode symbol including discontinuous dots.

The defect label may be a label that records defect information corresponding to the defect present in the defective target sheet. The defect label may be used to record the information of the defective target sheet and track the quality without being restricted by personnel, space and time. The defect information may include data indicating the defect type, defect position, defect size, defect dimensions, dimensions of the defective sheet, etc. The specific content included in defect information may be set according to production requirements.

The defect information recorded on the defect label may be represented by a two-dimensional barcode symbol composed of discontinuous dots, and the defect information of the target sheet may be recorded by the two-dimensional barcode symbol. The two-dimensional barcode symbol carried on the defect label may be generated based on a coding algorithm, for example, the coding algorithm may be uniform resource locator (URL) coding, rochester university (RU) algorithm coding, etc.

In the way described above, the defect label is obtained by generating a two-dimensional barcode symbol from the defect information, thereby satisfying the marking requirements for including more data, being more efficient and more accurate in the operation of a high-speed sheet production line, and implementing the recording of information and tracking of quality without being restricted by personnel, space and time.

In S130, the defect of the target sheet is labeled at the preset labeling position with the defect label of the target sheet.

When the target sheet is conveyed to the preset labeling position, the target sheet enters the labeling range of the labeling apparatus, and the labeling apparatus directly labels the target sheet. After the target sheet is inspected, it is required to determine whether a defect is present in the target sheet. If it is determined that a defect is present in the target sheet, it requires to generate defect information, and this step takes time to process, which may result in a problem of not being able to label at the defect inspection position in time. If the device is controlled to temporarily stop for labeling when the target sheet reaches the labeling apparatus from the preset defect inspection position, the device will be started and stopped continuously, resulting in a waste of resources. Therefore, the preset labeling position is used to perform labeling within the inspection range of the target sheet.

In the way described above, the preset labeling position is set as the attaching position of the defect label, the accuracy of labeling and production efficiency can be improved. Moreover, using the preset labeling position for labeling can not only avoid the problem of untimely labeling, but also realize high-speed operation of the production line. There is no need to temporarily stop the conveying for labeling, which saves resources.

In an embodiment, a target conveyor belt is controlled to drive forward, driving the target sheet to pass the preset defect inspection position and continue to be conveyed towards the preset labeling position. When the target sheet is driven by the target conveyor belt to move at a constant speed, accelerate or decelerate, the target conveyor belt keeps the target sheet relatively stationary, and the target sheet is placed on the target conveyor belt.

The target sheet is placed on the target conveyor belt when it starts to move. The target conveyor belt is driven by a reference drive shaft to bring the target sheet to move toward the preset defect inspection position. After being inspected by the machine visual inspection device, the target sheet is conveyed towards the preset labeling position. The target sheet is driven by the target conveyor belt to accelerate, decelerate and move at a uniform speed according to practical conveying situation. During the movement, the target sheet and the conveyor belt remain relatively stationary.

Figure 2:
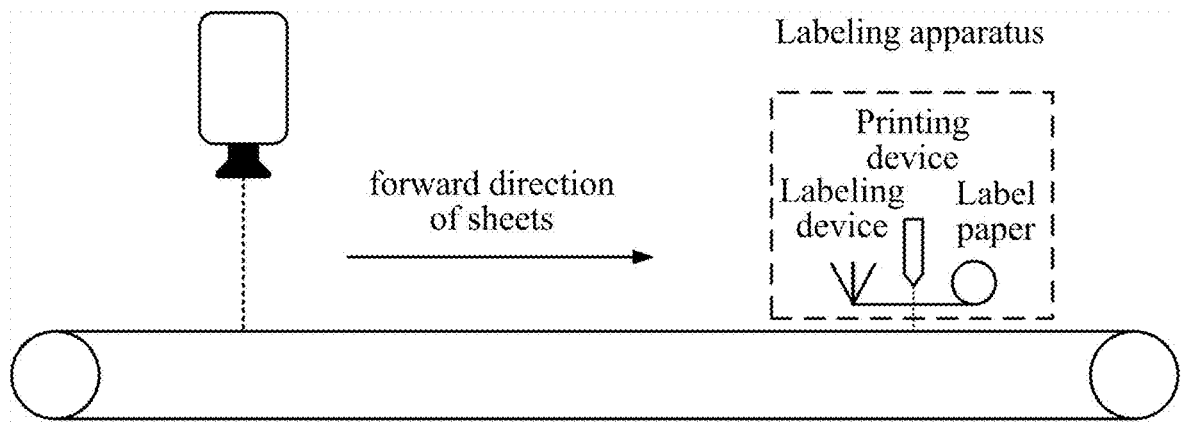
FIG. 2 is a schematic diagram showing the structure of a sheet installation position according to an embodiment of the present disclosure.

Exemplarily, FIG. 2 is a schematic diagram showing the structure of a sheet installation position according to an embodiment of the present disclosure. As shown in FIG. 2, the sheet used may be a roll of sheets, or square or rectangular single sheet obtained by cutting. The sheets obtained by cutting are placed on a conveyor belt, and a target sheet is conveyed by the conveyor belt for inspection and labeling. For the roll of sheets, it is required to unroll the sheets and place the unrolled sheets on the conveyor belt, and place a rolling apparatus at another end of the conveyor belt to roll up the sheets after inspection and labeling. The labeling apparatus includes a labeling device, a printing device and a label paper. The labeling device is configured to attach a label onto the target sheet, the printing device is configured to print the defect label on the label paper, and the label paper may be plastic paper or paper with a plastic cover.

In the way described above, conveying is performed by means of a conveyor belt, target sheets of different shapes can be conveyed, and the system can adapt to different conveying environments.

In an embodiment, driven by the target drive shaft, sheets on the production line that directly bear the traction force of the target drive shaft are controlled to move forward, bringing the target sheet on the production line to pass the preset defect inspection position and continue to be conveyed towards the preset labeling position, and the sheets on the production line are in direct contact with the target drive shaft.

The target sheet is unrolled and placed directly on the target drive shaft. The traction force is generated by controlling the rotation of the target drive shaft to drive the target sheet on the production line to be conveyed toward the preset defect inspection position and the preset labeling position.

Figure 3:
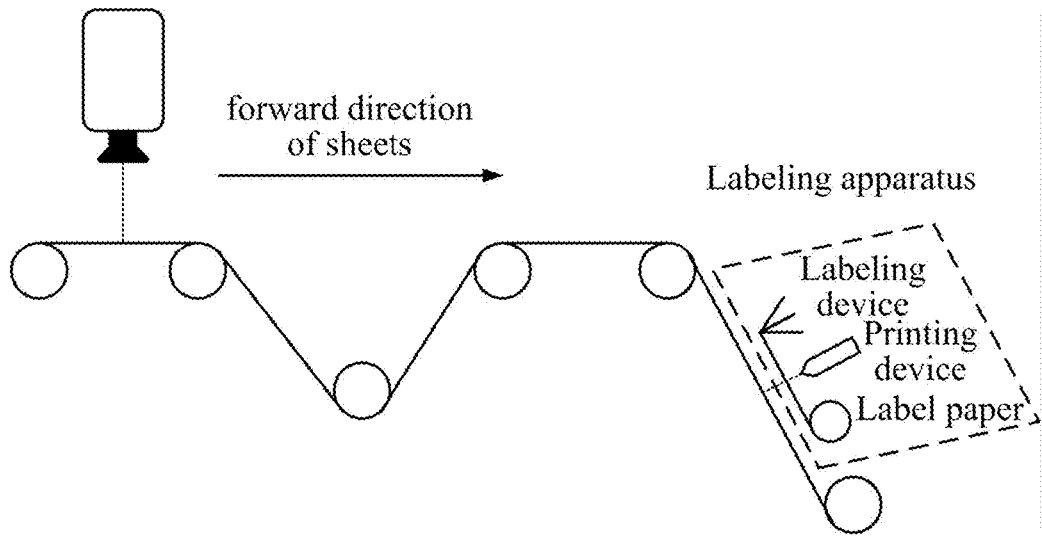
FIG. 3 is a schematic diagram showing the structure of another sheet installation position according to an embodiment of the present disclosure.

Exemplarily, FIG. 3 is a schematic diagram showing the structure of another sheet installation position according to an embodiment of the present disclosure. As shown in FIG. 3, a roll of sheets is used. The sheets are unrolled and placed on the target drive shaft, and the target drive shaft rotates to drive the movement of the target sheet. An apparatus that is able to roll up the sheets is placed downstream of the labeling apparatus to roll up the labeled target sheet.

In the way described above, the target drive shaft is in direct contact with the roll of sheets, it is possible to ensure that the target sheet is always in an unrolled state, and the sheets will not be rolled up due to the surrounding environment and other reasons, and thus the accuracy of labeling will not be adversely affected.

In the technical solution of this embodiment, a machine visual inspection device is used to capture an image of a target sheet conveyed to the preset defect inspection position, and inspect the image of the target sheet based on feature information of the target sheet to determine whether a defect is present in the target sheet. If it is determined that a defect is present in the target sheet, the defect information is generated into a two-dimensional barcode symbol and a defect label is generated. After passing the preset defect inspection position, the target sheet continues to be conveyed to the preset labeling position, and when the target sheet moves to the preset labeling position, labeling is performed. By using the two-dimensional barcode symbol to carry defect information, the problem of efficiency in sheet defect identification and analysis caused by unclear defect information is solved, thereby improving the efficiency in sheet defect identification and analysis.

Figure 4A:
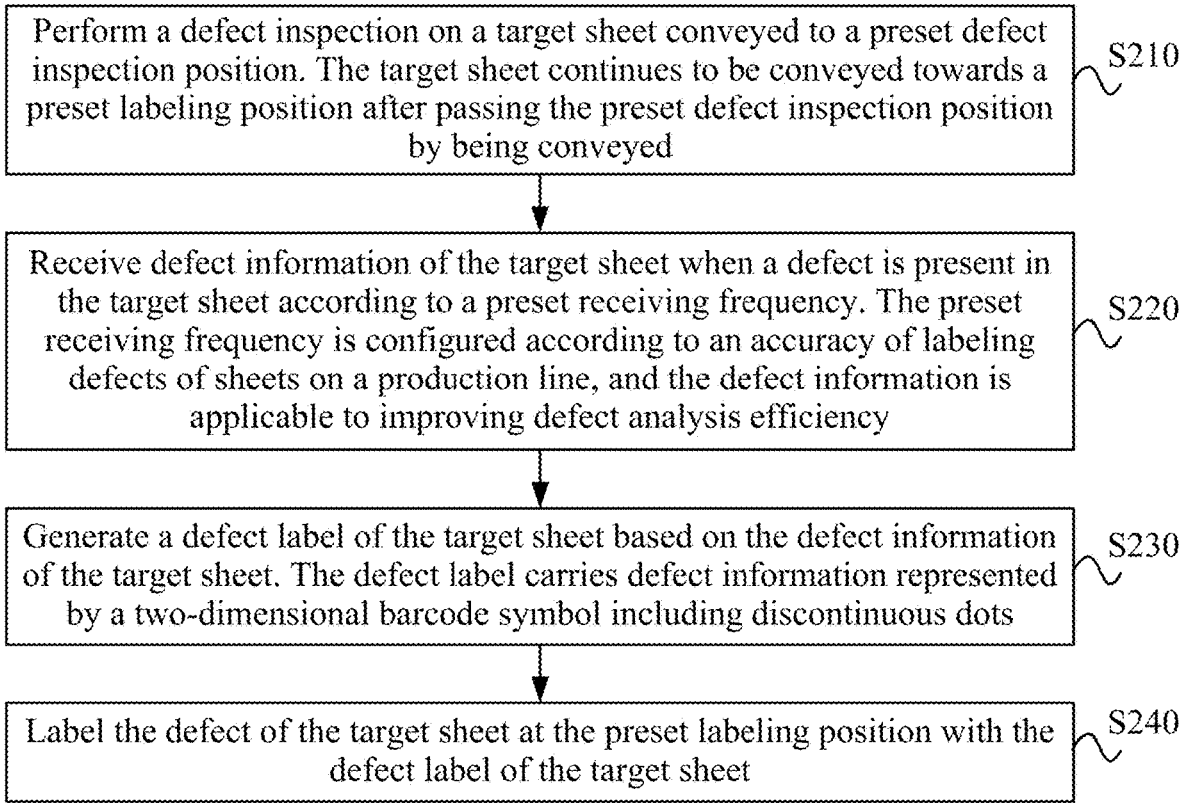
FIG. 4A is a flow chart of another machine vision-based sheet defect labeling method according to an embodiment of the present disclosure.

FIG. 4A is a flow chart of another machine vision-based sheet defect labeling method according to an embodiment of the present disclosure. The relationship between this embodiment and the above embodiment is that the way in sending defect information is further detailed. As shown in FIG. 4A, the method includes the steps below.

In S210, a defect inspection is performed on a target sheet conveyed to a preset defect inspection position. The target sheet continues to be conveyed towards a preset labeling position after passing the preset defect inspection position by being conveyed.

In S220, defect information of the target sheet is received when the defect is present in the target sheet according to a preset receiving frequency. The preset receiving frequency is configured according to an accuracy of labeling defects of sheets on a production line, and the defect information is applicable to improving defect analysis efficiency.

The preset receiving frequency may be the number of times a controller receives data from the machine visual inspection device or encoder, for example, sending data twice per second. The preset receiving frequency may also be determined according to the conveying distance of the target sheet, for example, sending data once every 0.1 meter of traveling of the target sheet. The preset receiving frequency is determined by the accuracy of labeling. A frequency is preset, and the target sheet is labeled according to the frequency. After labeling is completed, accuracy of the labeling is calculated. According to the accuracy of the labeling, it is determined whether the frequency satisfies the production requirements. If it is determined that the frequency does not satisfy the production requirements, the frequency is modified and experiments are conducted until a set frequency satisfies the production requirements, and the set frequency that satisfies the production requirements is used as the preset receiving frequency.

The encoder may be used to record angle change information of rotation of the target drive shaft, and the angle change information, may be converted into the motion displacement of the target sheet. The encoder may be attached to the target drive shaft near the machine visual inspection device to send information to the machine visual inspection device. The encoder may also be attached to the target drive shaft near the labeling apparatus to send information to the controller.

The accuracy of labeling may determine the preset receiving frequency. The accuracy of labeling may be a ratio of wrong labels allowed after a batch of materials is labeled, that is, the number of defect labels attached in wrong positions/the total number of defect labels.

For example, it is assumed that the accuracy of labeling is 5/100, that is, among 100 defect labels attached, 5 labels are incorrectly attached. Assuming that the initially set frequency is to send data once every two seconds, if 20 out of 100 defect labels are incorrectly attached, the requirements is not satisfied, the frequency is changed and the experiment is conducted again. The steps of changing the frequency and then conducting the experiment are repeated until the accuracy of labeling is within the allowable range, and the frequency at this time is used as the preset receiving frequency of the system.

Furthermore, corresponding to the preset receiving frequency is a preset transmitting frequency, is the transmitting frequency of the machine visual inspection device or the encoder.

When the sheet begins to be inspected, the machine visual inspection device continuously sends data to the controller at a preset receiving frequency, which includes both defect information of the target sheet and non-defect information of the target sheet. When defect information of the target sheet is received, the information is received and saved.

In an embodiment, receiving the defect information of the target sheet when the defect is present in the target sheet according to the preset receiving frequency includes: through a communication protocol, and at a preset receiving frequency, the machine visual inspection device transmits defect information of the target sheet to the controller.

According to the preset receiving frequency, the machine visual inspection device achieves real-time communication with the controller through the communication protocol. The communication protocol may be Transmission Control Protocol/Internet Protocol (TCP/IP), Modicon Communication (Modbus) protocol, etc. The encoder may use an encoder protocol to achieve communication with the controller or the machine visual inspection device. Specifically, the encoder protocol may be a standard synchronous serial interface (SSI) protocol, an EnDat interface protocol, etc.

In the way described above, the defect information of the target sheet is received at the preset receiving frequency, the transmission of the defect information of the target sheet can be achieved, thereby avoiding the problem that the labeling apparatus still does not receive the defect information when the target sheet moves to be under the labeling apparatus.

In S230, the defect label of the target sheet is generated based on the defect information of the target sheet. The defect label carries defect information represented by a two-dimensional barcode symbol including discontinuous dots.

The defect label of the target sheet may be completed according to the defect information of the target sheet using different two-dimensional code generation algorithms. The two-dimensional code generation algorithm may be quick response (QR) Code technology or DotCode technology.

In an embodiment, the generating a defect label of the target sheet based on the defect information of the target sheet includes steps A1 to A2.

In step A1: encoding is performed based on the defect information of the target sheet to generate defect code content of the target sheet.

The defect information of the target sheet is encoded using the above encoding algorithm to convert data obtained from the inspection into different data sequences. Then, a two-dimensional code generation algorithm is used to place the generated sequence in a matrix. According to information such as the amount of data in the matrix, a two-dimensional code bar pattern of varying depths is generated, which is the defect code content of the target sheet.

The DotCode technology is used to generate the two-dimensional barcode symbol with defect information. Firstly, the coding technology is used to encode the defect information to obtain coded information, and then the number of data characters ND is obtained according to the coded information, and the number of check characters NC is obtained according to the number of data characters. The number of dots in the two-dimensional barcode symbol, the area and distribution of the two-dimensional barcode symbol are determined according to ND and NC. DotCode is a two-dimensional barcode symbol composed of discontinuous dots, that may carry a large amount of information, has variable sizes and various shapes, and uses scattered dots to record defect information. QRCode technology uses patterns to record defect information. Therefore, the scattered points occupy less memory than the patterns, making printing more convenient and fast.

In an embodiment, encoding based on the defect information of the target sheet to generate defect code content of the target sheet may include: if both the target sheet and an adjacent sheet have defects, the defect code content of the target sheet is generated by performing encoding based on the defect information of the target sheet and the defect information of the adjacent sheet. The adjacent sheet is a sheet that is adjacent to the target sheet in position and has been conveyed and reached the preset defect inspection position before the target sheet is conveyed and reaches the preset defect inspection position, and continues to be conveyed towards the preset labeling position after passing the preset defect inspection position.

Figure 4B:
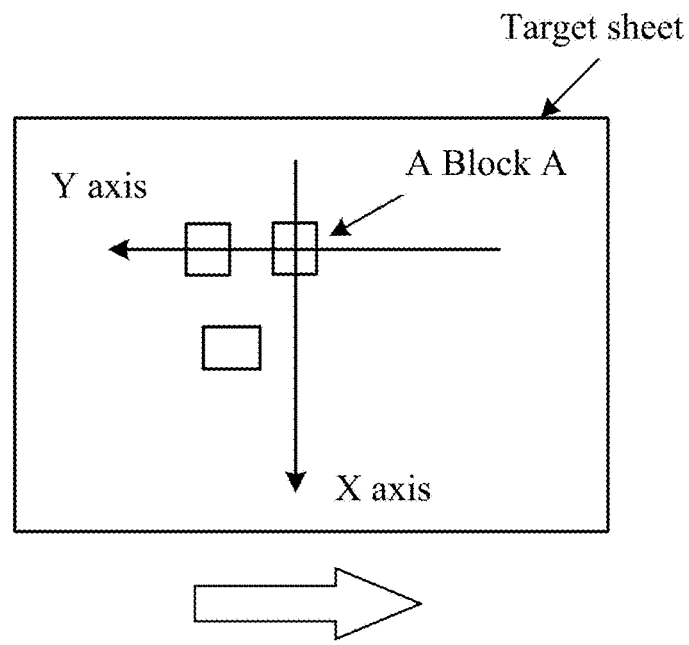
FIG. 4B is a schematic diagram showing the distribution of defects around a target sheet according to an embodiment of the present disclosure.

Referring to FIG. 4B, it takes a certain amount of processing time for the labeling apparatus to perform code printing and label attaching. When it is found that defects are present in multiple sheets in adjacent areas, a single labeling apparatus may not be able to satisfy the labeling speed requirements. In this case, the defects of multiple adjacent sheets may be merged, and the code printing and labeling may each be performed in one time. In this way, the defect code content of the target sheet not only includes the defect information of the target sheet, but also includes the defect information of at least one adjacent sheet. In this case, the generated defect code content contains information of multiple defects, and the position information of each defect may be equivalent to the coordinate position relative to the target sheet. As shown in FIG. 4B, a block A represents a defect of the target sheet, and other blocks represent defects of adjacent sheets. The block A corresponds to the position where the defect label of the target sheet is attached. The defect position information corresponding to the adjacent sheets may be represented based on the relative positions of the adjacent sheets relative to the target sheet shown in the figure. In the way described above, the efficiency of labeling can be improved.

In step A2, the defect code content of the target sheet is printed on a label tape to obtain the defect label of the target sheet.

The printing the defect code content of the target sheet on the tape may be performed when the defect code content of the target sheet is generated, or performed when the target sheet has still a certain distance away from the preset labeling position.

The information is printed on the tape first and then the printed label is attached on the target sheet, which can solve the problem of damaging the sheet caused by printing the information directly on the sheet; it can further solve the problem of not having sufficient time to attach the label when the target sheet moves to the preset labeling position.

In the way described above, the defect label of the target sheet is generated based on the defect information of the target sheet, thereby obtaining the defect information of the target sheet.

In S240, the defect of the target sheet is labeled at the preset labeling position with the defect label of the target sheet.

In an embodiment, multiple labeling apparatuses are equipped at the preset labeling position, so that if both the target sheet and the adjacent sheet have defects, different labeling apparatuses are used to attach the defect label of the target sheet and the defect label of the adjacent sheet in sequence at the preset labeling position. The adjacent sheet is a sheet that is adjacent to the target sheet in position and has been conveyed and reached the preset defect inspection position before the target sheet is conveyed and reaches the preset defect inspection position, and continues to be conveyed towards the preset labeling position after passing the preset defect inspection position.

Figure 4C:
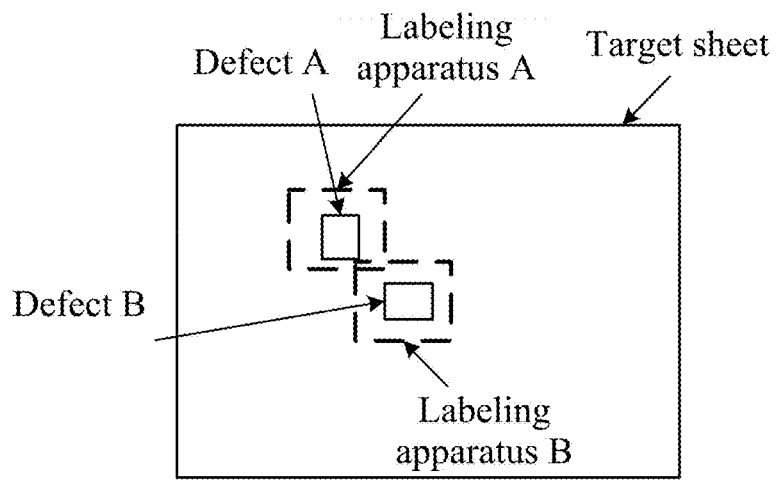
FIG. 4C is a schematic diagram showing the structure of a labeling position according to an embodiment of the present disclosure.

Referring to FIG. 4C, it takes a certain amount of processing time for the labeling apparatus to perform code printing and label attaching. When it is found that defects are present in multiple sheets in adjacent areas, a single labeling apparatus may not be able to satisfy the labeling speed requirements, and in this case, different labeling apparatuses may be used to attach the defect label of the target sheet and the defect label of the adjacent sheet in the preset labeling position in sequence. In this way, code printing can be performed for different defects at the same time and label attaching can be performed for different defects in sequence quickly. As shown in FIG. 4C, a defect A and a defect B represent multiple defects present in the target sheet. In the process of label attaching, a labeling apparatus A is used to label the defect A, and a labeling apparatus B is used to label the defect B. The above method can improve the efficiency of labeling.

In the technical solution of this embodiment, the defect information of the target sheet is transmitted in real time at a preset receiving frequency. After receiving the defect information, the controller generates a two-dimensional barcode symbol from the defect information. The labeling apparatus prints the two-dimensional barcode symbol on the tape to generate the defect label, and labels the target sheet. By using the two-dimensional code generation technology to generate the defect label carrying the defect information, the marking requirements for including more data, being more efficient and more accurate in the operation of high-speed sheet production line can be satisfied, and the recording of information and tracking of quality can be tracked without being restricted by personnel, space and time, and fast printing can be realized to improve production efficiency.

Figure 5:
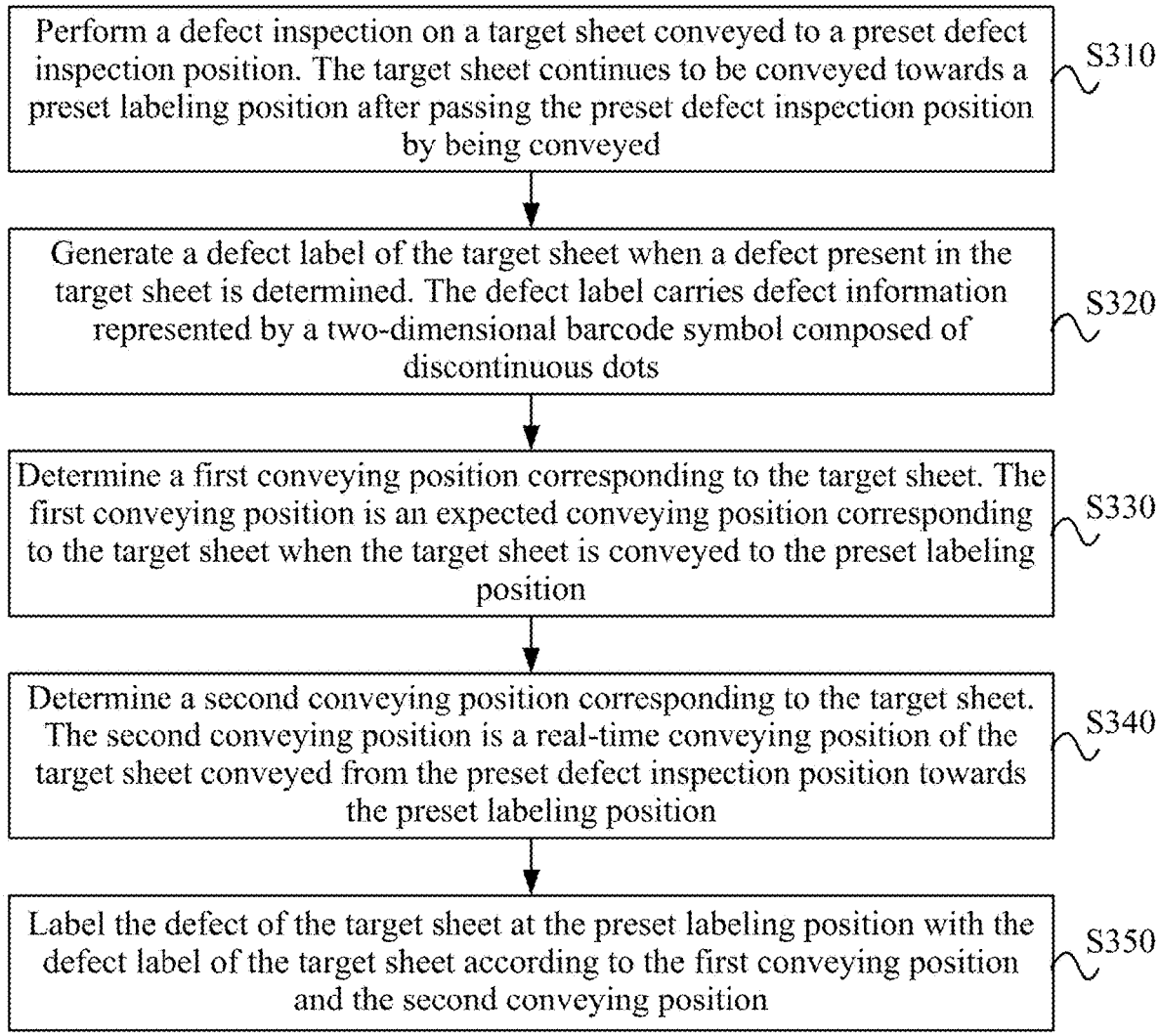
FIG. 5 is a flow chart of another machine vision-based sheet defect labeling method according to an embodiment of the present disclosure.

FIG. 5 is a flow chart of another machine vision-based sheet defect labeling method according to an embodiment of the present disclosure. The relationship between this embodiment and the above embodiment is that step S130 is further detailed. As shown in FIG. 5, the method includes the steps below.

In S310, a defect inspection is performed on a target sheet conveyed to a preset defect inspection position. The target sheet continues to be conveyed towards a preset labeling position after passing the preset defect inspection position by being conveyed.

In S320, a defect label of the target sheet is generated when a defect present in the target sheet is determined. The defect label carries defect information represented by a two-dimensional barcode symbol including discontinuous dots.

In S330, a first conveying position corresponding to the target sheet is determined. The first conveying position is an expected conveying position corresponding to the target sheet when the target sheet is conveyed to the preset labeling position.

The expected conveying position may be a position, expected by the system, corresponding to the target sheet when the target sheet moves to the preset labeling position. The first conveying position may be conveying position information obtained by converting a pulse value corresponding to the encoder on the target drive shaft when the target sheet is conveyed to the preset labeling position.

After passing the position of the machine visual inspection device, the target sheet continues to be conveyed on the production line. When the target sheet is conveyed to the preset labeling position, the conveying position corresponding to the target sheet is the first conveying position.

In an embodiment, determining the first conveying position corresponding to the target sheet includes steps A3 to A5.

In step A3, a third conveying position corresponding to the target sheet is determined. The third conveying position is a conveying position where the target sheet is located when the target sheet is conveyed to the preset defect inspection position for defect inspection.

The third conveying position may be conveying position information obtained by converting an output pulse value corresponding to the encoder on the corresponding target drive shaft when the target sheet is conveyed to the preset defect inspection position.

The target sheet is conveyed from the production line. When the target sheet is conveyed to the preset defect inspection position, the conveying position corresponding to the target sheet is the third conveying position.

In step A4, a reference conveying distance corresponding to the target sheet is determined. The reference conveying distance is a conveying distance from the preset defect inspection position to the preset labeling position.

The reference conveying distance may be obtained by subtracting the value corresponding to the preset defect inspection position from the value corresponding to the preset labeling position. That is, the reference conveying distance may be position variation obtained by converting the variation between pulse values output by the encoder when the target sheet reaches the preset defect inspection position and the preset labeling position.

In step A5, the first conveying position corresponding to the target sheet is determined according to the third conveying position and the reference conveying distance.

The first conveying position may be determined by adding the reference conveying distance to the third conveying position.

In the way described above, the first conveying position is determined through the third conveying position and the reference conveying distance, so that whether the target sheet can accurately reach the preset labeling position in the conveying can be timely determined through this determination in advance, thereby improving the accuracy of labeling.

In an embodiment, each of the first conveying position, the third conveying position and the reference conveying distance is determined by a pulse output value output by the encoder associated with the reference drive shaft, and the reference drive shaft is capable of drive the target sheet to continue to be conveyed towards the preset labeling position after passing the preset defect inspection position.

The target sheet runs on the production line. The overall movement process relies on the rotation of the drive shaft to drive the target sheet to move toward the preset defect inspection position. The moving positions of the target sheet are determined according to the encoder attached to the drive shaft. The output pulse of the encoder is converted into displacement information, and the conveying position of the target sheet on the production line is thus be obtained, thereby determining the first conveying position, the third conveying position and the reference conveying distance of the target sheet. After the target sheet passes the preset defect inspection position, the reference drive shaft drives the target sheet to move toward the preset labeling position.

In the way described above, by determining the first conveying position, it is possible to determine whether the target sheet has reached the preset labeling position, thereby improving the accuracy of labeling.

In S340, a second conveying position corresponding to the target sheet is determined. The second conveying position is a real-time conveying position of the target sheet conveyed from the preset defect inspection position towards the preset labeling position.

The second conveying position may be conveying position information obtained by converting the real-time output pulse value corresponding to the encoder on the target drive shaft in the process of conveying of the target sheet towards the preset labeling position after passing the preset defect inspection position.

After the target sheet passes the preset defect inspection position, the target sheet is conveyed towards the preset labeling position. Before the target sheet passes the preset labeling position, the real-time conveying position of the target sheet is the second conveying position.

Figure 6:
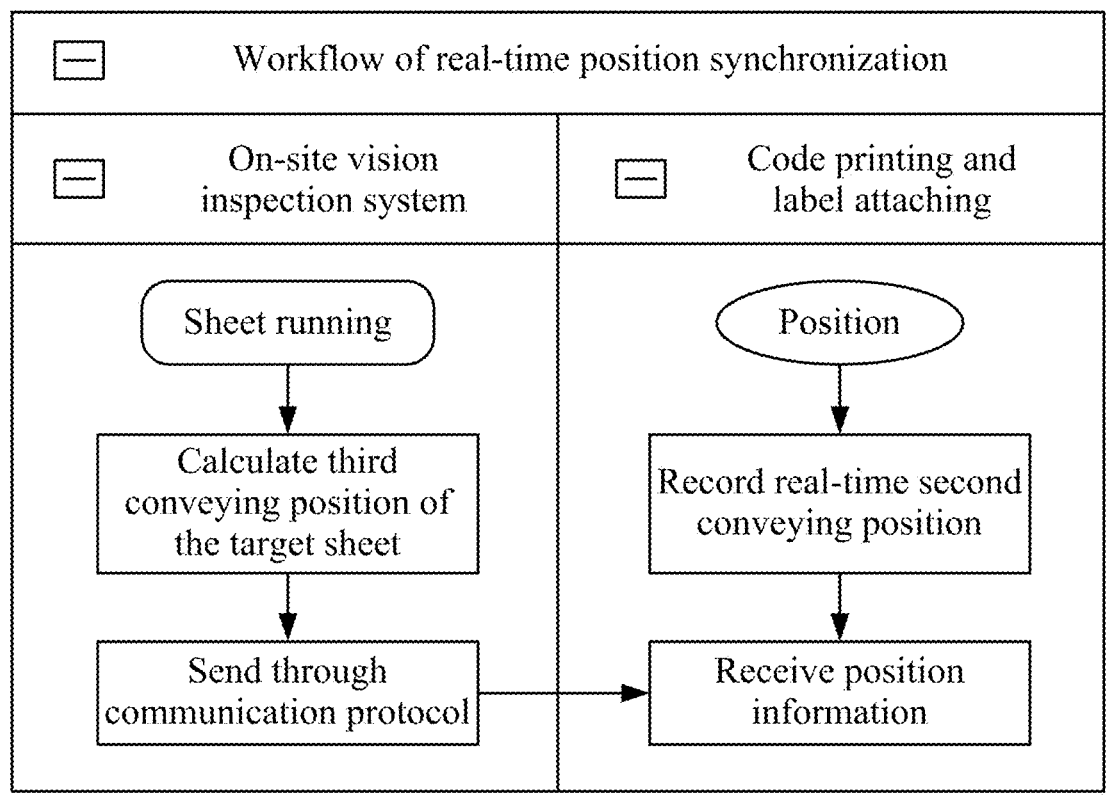
FIG. 6 is a workflow chart of real-time conveying position synchronization according to an embodiment of the present disclosure.

Exemplarily, FIG. 6 is a workflow chart of real-time conveying position synchronization according to an embodiment of the present disclosure. As shown in FIG. 6, when the target sheet starts to move, the current longitudinal position of the sheet is calculated by an encoder and is sent to the controller to determine whether the target sheet has reached the preset defect inspection position. After the target sheet reaches the preset defect inspection position, the current longitudinal conveying position of the target sheet is calculated, and the longitudinal conveying position is sent to the labeling apparatus through the communication protocol within the preset receiving frequency. After receiving the position information, the labeling apparatus determines the first conveying position according to the reference conveying distance, and records in real time the longitudinal position information of the target sheet after passing the preset defect inspection position, and determines the position of the target sheet from the labeling apparatus.

Exemplarily, the current conveying position of the target sheet may further be determined based on the longitudinal position and transverse position of the target sheet, that is, the longitudinal position of the target sheet changes, but the transverse position of the target sheet is fixed. When the target sheet being conveyed is offset on the conveyor belt or the target drive shaft due to external factors, the transverse position of the target sheet may change, resulting in inaccurate labeling position. This requires the labeling apparatus to move according to the offset transverse position to ensure the accuracy of labeling.

In S350, according to the first conveying position and the second conveying position, the defect of the target sheet is labeled at the preset labeling position with the defect label of the target sheet.

According to the first conveying position and the second conveying position, the current position of the target sheet and the distance of the target sheet from the preset labeling position are determined. According to the first conveying position, it may further be determined whether the target sheet reaches the preset labeling position, and when the target sheet reaches the preset labeling position, the target sheet is labeled.

In an embodiment, labeling, according to the first conveying position and the second conveying position, the defect of the target sheet at the preset labeling position with the defect label of the target sheet includes steps A6 to A7.

In step A6, according to the first conveying position and the second conveying position, it is determined whether the defect of the target sheet is conveyed to the preset labeling position.

According to the first conveying position and the second conveying position, it can be determined in real time the distance of the target sheet from the preset conveying position to determine whether the defect of the target sheet is conveyed to the preset labeling position.

In step A7: when it is inspected that the defect of the target sheet is conveyed to the preset labeling position, the defect of the target sheet is labeled at the preset labeling position in a preset labeling direction with the defect label of the target sheet to attach the defect label of the target sheet to the defect of the target sheet.

When it is inspected that the target sheet is conveyed to the preset labeling position, the defect label is attached onto the target sheet in the preset labeling direction to complete the labeling.

In the way described above, the current conveying position of the target sheet is determined and whether the target sheet is conveyed to the preset labeling position is determined and then labeling is performed, thereby improving accuracy of labeling.

Exemplarily, when the defect information of the target sheet happens to be within the field of vision of the camera of the machine visual inspection device, then after the inspection is completed, the target sheet continues to move towards the preset labeling position, and when the target sheet sheet reaches the preset labeling position, labeling is performed. When the defect information of the target sheet obtained by inspection of the machine visual inspection device in its field of vision is at an edge or corner of the target sheet, it is necessary to calculate the distance of the defect position from the preset defect inspection position. When the target sheet reaches the preset labeling position, it is necessary for the target sheet to further move the above distance and then it is determined whether the defect has reached the preset labeling position. When it is determined that the defect has reached the preset labeling position, the defect is labeled.

Figure 7:
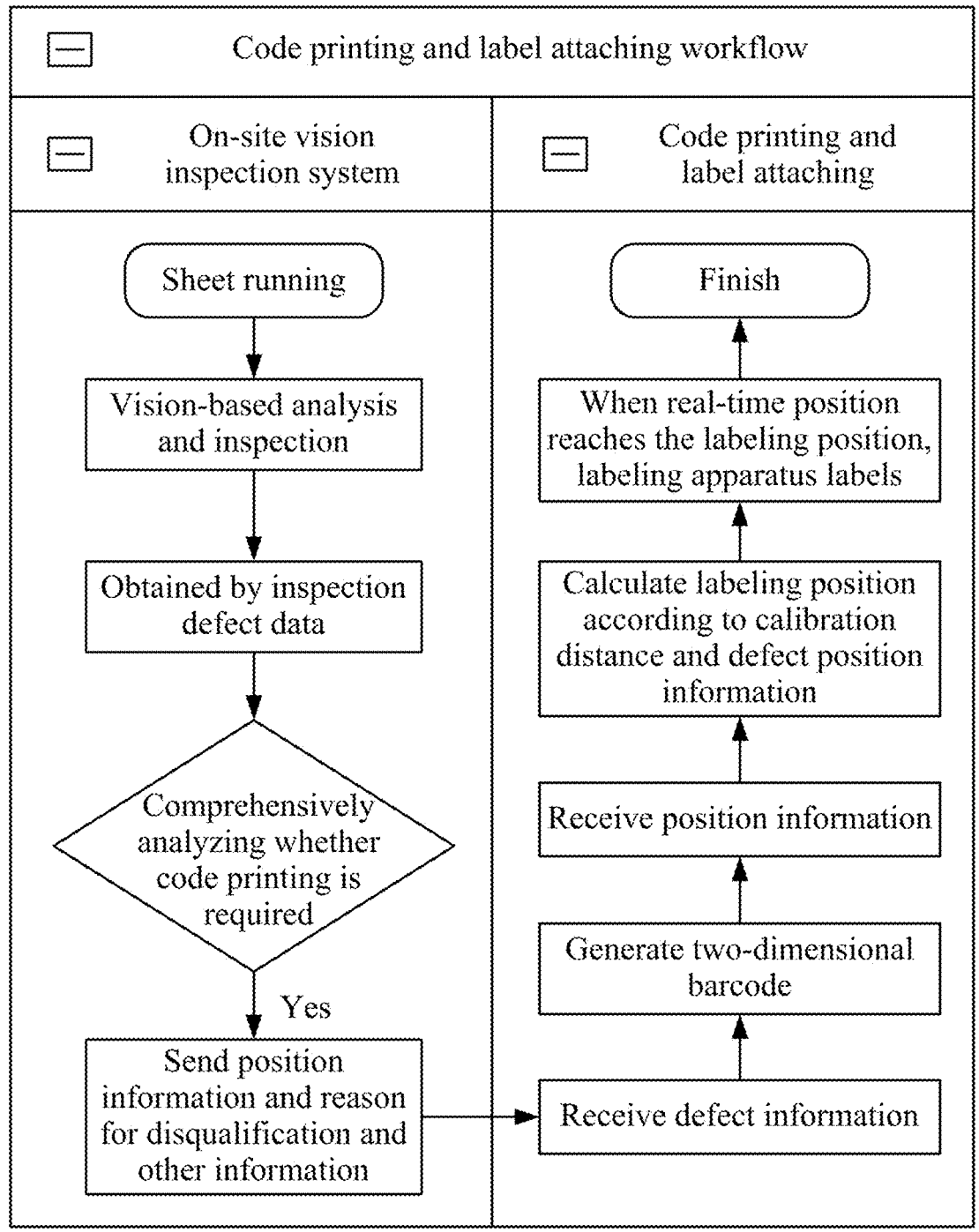
FIG. 7 is a flow chart of a code printing and labeling process according to an embodiment of the present disclosure.

Exemplarily, FIG. 7 is a flow chart of a code printing and labeling process according to an embodiment of the present disclosure. As shown in FIG. 7, first, the target sheet is inspected. When it is inspected that a defect is present in the target sheet, defect information is generated and transmitted to the labeling apparatus. After receiving the defect information, the labeling apparatus generates a two-dimensional barcode symbol according to the DotCode technology, receives the current position information of the target sheet, calculates the labeling position of the target sheet, and labels the target sheet when the target sheet moves to the preset labeling position. The calibration distance in FIG. 7 is the reference conveying distance.

According to the technical solution in this embodiment, the first conveying position and the third conveying position are used to determine when the target sheet reaches the preset defect inspection position and the preset labeling position, and the distance of the target sheet from the preset labeling position after the target sheet passes the preset defect inspection position is determined through the second conveying position. The current position of the target sheet can be monitored in real time through the changes in the three positions, which improves the accuracy of labeling and satisfies the requirements of high-speed operation of the production line.

Figure 8:
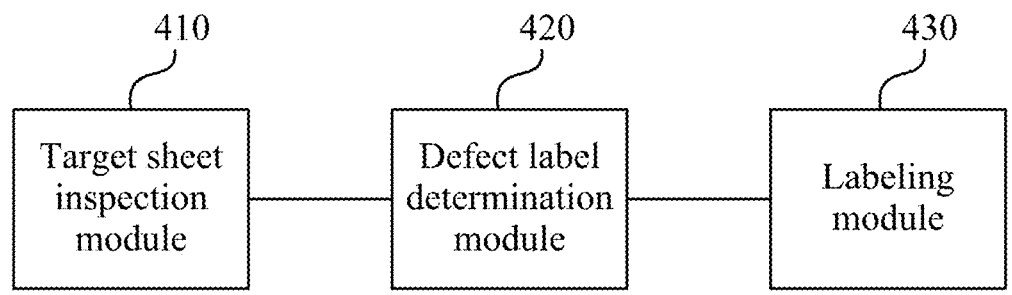
FIG. 8 is a schematic diagram showing the structure of a machine vision-based sheet defect labeling apparatus according to an embodiment of the present disclosure.

FIG. 8 is a is a schematic diagram showing the structure of a machine vision-based sheet defect labeling apparatus according to an embodiment of the present disclosure. As shown in FIG. 8, the apparatus includes: a target sheet inspection module 410, a defect label determination module 420 and a labeling module 430.

The target sheet inspection module 410 is configured to perform a defect inspection on a target sheet conveyed to a preset defect inspection position. The target sheet continues to be conveyed towards a preset labeling position after passing the preset defect inspection position by being conveyed.

The defect label determination module 420 is configured to generate a defect label of the target sheet when a defect present in the target sheet is determined. The defect label carries defect information represented by a two-dimensional barcode symbol including discontinuous dots.

The labeling module 430 is configured to label the defect of the target sheet at the preset labeling position with the defect label of the target sheet.

In an embodiment, the defect label determination module 420 includes: a defect information sending unit and a defect label generating unit.

The defect information sending unit is configured to receive defect information of the target sheet when the defect is present in the target sheet according to a preset receiving frequency. The preset receiving frequency is configured according to an accuracy of labeling defects of sheets on a production line, and the defect information is applicable to improving defect analysis efficiency.

The defect label generating unit is configured to generate the defect label of the target sheet based on the defect information of the target sheet.

In an embodiment, the defect label generating unit includes a defect information encoding subunit and a defect label printing subunit.

The defect information encoding subunit is configured to perform encoding based on defect information of the target sheet to generate defect code content of the target sheet.

The defect label printing subunit is configured to print the defect code content of the target sheet onto a label tape to obtain the defect label of the target sheet.

In an embodiment, the labeling module 430 includes a first conveying position determining unit, a second conveying position determining unit and a labeling unit.

The first conveying position determining unit is configured to determine a first conveying position corresponding to the target sheet. The first conveying position is an expected conveying position corresponding to the target sheet when the target sheet is conveyed to the preset labeling position.

In an embodiment, the first conveying position determining unit includes a third conveying position determining subunit, a reference conveying distance determining subunit and a first conveying position determining subunit.

The third conveying position determining subunit is configured to determine a third conveying position corresponding to the target sheet. The third conveying position is a conveying position where the target sheet is located when the target sheet is conveyed to the preset defect inspection position for defect inspection.

The reference conveying distance determining subunit is configured to determine a reference conveying distance corresponding to the target sheet. The reference conveying distance is a conveying distance from the preset defect inspection position to the preset labeling position.

The first conveying position determining subunit is configured to determine the first conveying position corresponding to the target sheet according to the third conveying position and the reference conveying distance.

In an embodiment, the first conveying position determining unit further includes a position acquisition subunit.

The position acquisition subunit is configured to acquire the first conveying position, the third conveying position and the reference conveying distance determined by a pulse output value output by an encoder associated with a reference drive shaft. The reference drive shaft can drive the target sheet to continue to be conveyed towards the preset labeling position after passing the preset defect inspection position.

The second conveying position determining unit is configured to determine a second conveying position corresponding to the target sheet. The second conveying position is a real-time conveying position of the target sheet conveyed from the preset defect inspection position towards the preset labeling position.

The labeling unit is configured to label the defect of the target sheet at the preset labeling position with the defect label of the target sheet according to the first conveying position and the second conveying position.

In an embodiment, the labeling unit includes a labeling position determining subunit and a labeling subunit.

The labeling position determining subunit is configured to determine according to the first conveying position and the second conveying position whether the defect of the target sheet is conveyed to a preset labeling position.

The labeling subunit is configured to, when it is inspected that the defect of the target sheet is conveyed to the preset labeling position, label the defect of the target sheet at the preset labeling position in a preset labeling direction with the defect label of the target sheet to attach the defect label of the target sheet to the defect of the target sheet.

In an embodiment, the machine vision-based sheet defect labeling apparatus further includes: a target sheet conveying module and a conveyor belt drive module.

The target sheet conveying module is configured to control a target conveyor belt to drive forward, drive the target sheet to pass the preset defect inspection position and continue to be conveyed towards the preset labeling position. When the target sheet is driven by the target conveyor belt to move at a uniform speed, accelerate or decelerate, the target conveyor belt keeps the target sheet relatively stationary, and the target sheet is placed on the target conveyor belt.

The conveyor belt drive module is configured to control sheets on the production line, driven by the target drive shaft, that directly bear the traction force of the target drive shaft to move forward to bring the target sheet on the production line to pass the preset defect inspection position and continue to be conveyed towards the preset labeling position. The sheets on the production line are in direct contact with the target drive shaft.

The machine vision-based sheet defect labeling apparatus according to the embodiments of the present disclosure can execute the machine vision-based sheet defect labeling method according to any embodiment of the present disclosure described above, and has the corresponding functions for executing the machine vision-based sheet defect labeling method and can achieve the corresponding beneficial effects. For detailed process, reference may be made to the relevant operations of the machine vision-based sheet defect labeling method in the aforementioned embodiments.

Figure 9:
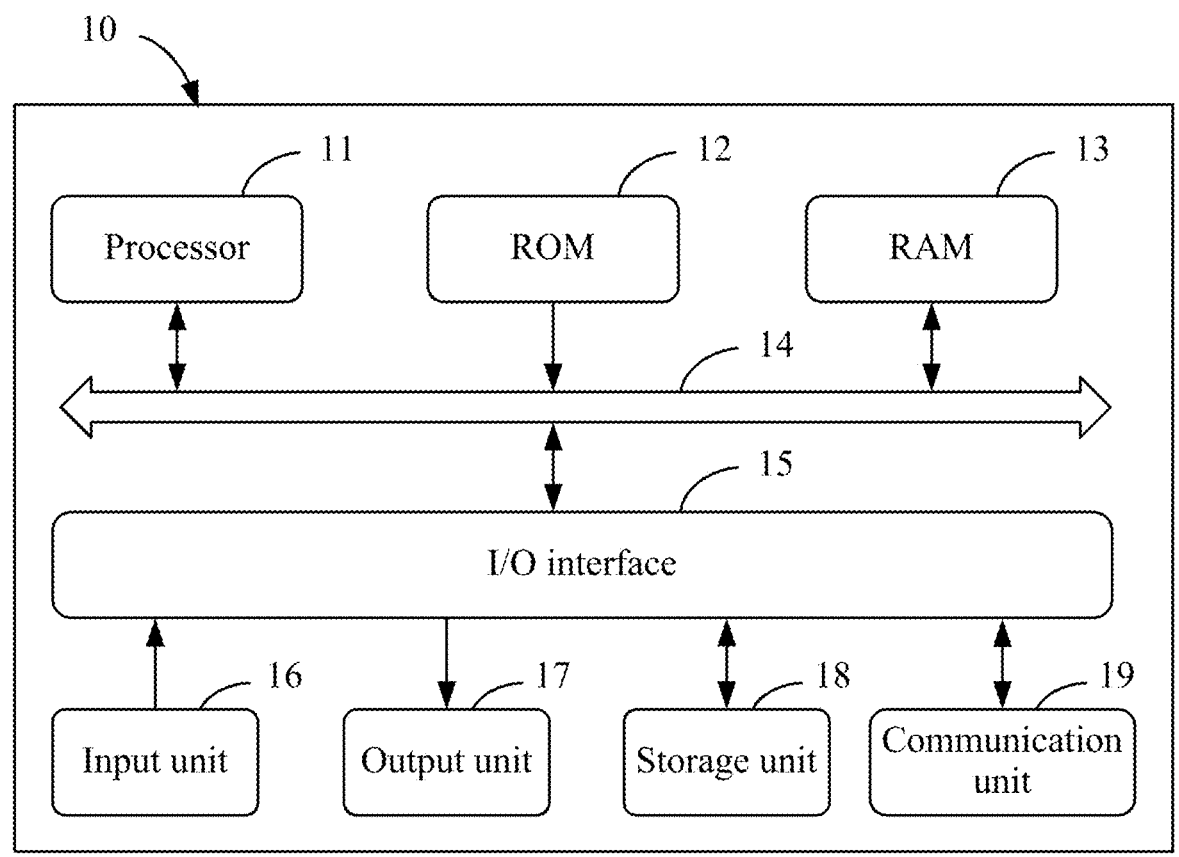
FIG. 9 is a schematic diagram showing the structure of an electronic device for implementing the machine vision-based sheet defect labeling method according to embodiments of the present disclosure.

FIG. 9 shows a schematic structural diagram of an electronic device that can be used to implement the vision-based sheet defect labeling method according to the embodiments of the present application. It is intended to use the electronic device to represent various forms of digital computers, such as laptops, desktops, workstations, personal digital assistants, servers, blade servers, mainframes, and other suitable computers. The electronic device may further represent various forms of mobile devices, such as personal digital processing, cellular phones, smart phones, wearable devices (e.g., helmets, glasses, watches, etc.), and other similar computing devices. The components shown herein, their connections and relationships, and their functions, are used as examples only, and are not intended to limit implementation of the invention described and/or claimed herein.

As shown in FIG. 9, an electronic device 10 includes at least one processor 11, and a memory communicatively connected with the at least one processor 11, such as a read-only memory (ROM) 12, a random access memory (RAM) 13, etc., where the memory stores a computer program executable by at least one processor, and the processor 11 can perform various appropriate actions and processes according to a computer program stored in the ROM 12 or a computer program loaded from a storage unit 18 into the RAM 13. In the RAM 13, various programs and data necessary for the operation of the electronic device 10 may further be stored. The processor 11, ROM 12, and RAM 13 are connected to each other through a bus 14. An input/output (I/O) interface 15 is also connected to the bus 14.

Multiple components in the electronic device 10 are connected to the I/O interface 15, include: an input unit 16, such as a keyboard, a mouse, etc.; an output unit 17, such as various types of displays, speakers, etc.; a storage unit 18, such as a magnetic disk, an optical disk etc.; and a communication unit 19, such as a network card, a modem, a wireless communication transceiver, and the like. The communication unit 19 allows the electronic device 10 to exchange information/data with other devices through a computer network such as the Internet and/or various telecommunication networks.

The processor 11 may be various general and/or special purpose processing components having processing and computing capabilities. Some examples of the processor 11 include, but are not limited to, a central processing unit (CPU), a graphics processing unit (GPU), various dedicated artificial intelligence (AI) computing chips, various processors that run machine learning model algorithms, digital signal processing processors (DSP), and any suitable processor, controller, microcontroller, etc. The processor 11 performs the various methods and processes described above, for example, the machine vision-based sheet defect labeling method.

In some embodiments, the machine vision-based sheet defect labeling method can be implemented as a computer program, which is tangibly contained in a computer-readable storage medium, for example, a storage unit 18. In some embodiments, part or all of the computer program may be loaded and/or installed on the electronic device 10 via the ROM 12 and/or the communication unit 19. When the computer program is loaded into the RAM 13 and performed by the processor 11, one or more steps of the machine vision-based sheet defect labeling method described above can be performed. In an embodiment, in other embodiments, the processor 11 may be configured in any other appropriate way (for example, by means of firmware) to perform the machine vision-based sheet defect labeling method.

Various implementations of the system and technique described above herein can be implemented in a digital electronic circuit system, an integrated circuit system, a field programmable gate array (FPGA), an application specific integrated circuit (ASIC), application specific standard parts (ASSPs), a system on chip (SOC), a complex programming logic device (CPLD), a computer hardware, firmware, software, and/or combinations thereof. These various embodiments may include being implemented in one or more computer programs which can be performed and/or interpreted on a programmable system including at least one programmable processor, the programmable processor can be a special-purpose or general-purpose programmable processor, can receive data and instruction from storage system, at least one input device, and at least one output device, and send data and instruction to the storage system, the at least one input device, and the at least one output device.

The one or more computer programs for implementing the method of the present disclosure may be written in one programming language or any combination of more programming languages. These computer programs can be provided to a processor of a general-purpose computer, a special-purpose computer or other programmable data processing apparatus, so that the computer programs, when being performed by the processor, causes the functions/operations specified in the flow chart and/or block diagram to be implemented. The computer programs may be performed entirely on the machine, partly on the machine, partly on the machine and partly on a remote machine as a stand-alone software package, or entirely on a remote machine or remote server.

In the context of the present disclosure, a computer readable storage medium may be a tangible medium that may contain or store a computer program for use by an instruction execution system, apparatus or device or use in conjunction with an instruction execution system, apparatus or device. A computer readable storage medium may include, but is not limited to, an electronic, magnetic, optical, electromagnetic, infrared, or semiconductor system, apparatus, or device, or any suitable combination of the foregoing. In an embodiment, a computer readable storage medium may be a machine readable signal medium. More specific examples of machine-readable storage media would include one or more wire-based electrical connected or portable computer discs, hard drives, RAM, ROM, erasable programmable read-only memory (EPROM) or flash memory, optical fiber, compact disk read-only memory (CD-ROM), optical storage, magnetic storage, or any suitable combination of the foregoing.

In order to provide interaction with the user, the systems and techniques described herein can be implemented on an electronic device having a display device (e.g., a cathode ray tube (CRT) or liquid crystal display (LCD) monitor) configured to display information to the user; and a keyboard and a pointing device (e.g., a mouse or a trackball) through which the user can provide input to the electronic device. Other kinds of devices can also be configured to provide interaction with the user; for example, the feedback provided to the user can be any form of sensory feedback (e.g., visual feedback, auditory feedback, or tactile feedback); and can be in any form (including acoustic input, speech input or, tactile input) to receive input from the user.

The systems and techniques described herein can be implemented in a computing system that includes back-end components (e.g., as a data server), or a computing system that includes middleware components (e.g., an application server), or a computing system that includes front-end components (e.g., a user computer having a graphical user interface or web browser through which a user can interact with embodiments of the system and technique described herein), or be implemented in a computing system including any combination of such backend components, middleware components, or front-end components. The components of the system can be interconnected by any form or medium of digital data communication, (e.g., a communication network). Examples of communication network include: local area networks (LANs), wide area network (WAN), blockchain network, and the Internet.

A computing system can include a client and a server. The client and the server are generally remote from each other and typically interact through a communication network. The relationship of the client and the server arises by computer programs running on the respective computers and having a client-server relationship to each other. The server can be a cloud server, also known as a cloud computing server or a cloud host, and is a host product in the cloud computing service system to overcome the drawbacks of difficult management and weak business expansion in traditional physical hosts and virtual private servers VPSs.

It is to be appreciated that, steps may be reordered, added or deleted using the various forms of flow shown above. For example, multiple steps described in the present application may be performed in parallel, sequentially, or in a different order, as long as the desired result of the technical solution of the present disclosure can be achieved, which is not limited herein.

The above embodiments do not constitute limitations on the protection scope of the present disclosure. It should be apparent to the person skilled in the art that various modifications, combinations, sub-combinations and substitutions may be made depending on design requirements and other factors. Any modifications, equivalent substitutions and improvements made within the spirit and principles of the present disclosure should be included in the protection scope of the present disclosure.

What is claimed is:

1. A machine vision-based sheet defect labeling method, comprising:

performing a defect inspection on a target sheet conveyed to a preset defect inspection position, wherein the target sheet continues to be conveyed towards a preset labeling position after passing the preset defect inspection position by being conveyed;

determining a defect label of the target sheet when a defect is present in the target sheet, wherein the defect label carries defect information represented by a two-dimensional barcode symbol comprising discontinuous dots, wherein the two-dimensional barcode symbol is generated by using DotCode technology; and labeling the defect of the target sheet at the preset labeling position with the defect label of the target sheet;

wherein the determining a defect label of the target sheet when a defect is present in the target sheet comprises:

receiving the defect information of the target sheet when the defect is present in the target sheet according to a preset receiving frequency, wherein the preset receiving frequency is configured according to an accuracy of labeling defects of sheets on a production line; and generating the defect label of the target sheet based on the defect information of the target sheet;

wherein the generating the defect label of the target sheet based on the defect information of the target sheet comprises:

performing encoding based on the defect information of the target sheet to generate defect code content of the target sheet; and printing the defect code content of the target sheet on a label tape to obtain the defect label of the target sheet;

wherein the performing encoding based on the defect information of the target sheet to generate defect code content of the target sheet comprises:

in response to that both the target sheet and an adjacent sheet have defects, generating the defect code content of the target sheet by performing encoding based on the defect information of the target sheet and defect information of the adjacent sheet, wherein the adjacent sheet is a sheet that is adjacent to the target sheet in position and has been conveyed and reached the preset defect inspection position before the target sheet is conveyed and reaches the preset defect inspection position, and continues to be conveyed towards the preset labeling position after passing the preset defect inspection position; and in response to that defects are present in a plurality of sheets in adjacent areas, merging defects of a plurality of adjacent sheets, and performing code printing and labeling for the plurality of adjacent sheets in one time, wherein the defect code content of the target sheet comprises the defect information of the target sheet and defect information of at least one of the plurality of adjacent sheet, the defect information comprises position information of the defect, and the position information of the defect is a coordinate position relative to the target sheet.

2. The machine vision-based sheet defect labeling method according to claim 1, wherein the labeling the defect of the target sheet at the preset labeling position with the defect label of the target sheet comprises:

determining a first conveying position corresponding to the target sheet, wherein the first conveying position is an expected conveying position corresponding to the target sheet when the target sheet is conveyed to the preset labeling position;

determining a second conveying position corresponding to the target sheet, wherein the second conveying position is a real-time conveying position of the target sheet conveyed from the preset defect inspection position towards the preset labeling position; and labeling, according to the first conveying position and the second conveying position, the defect of the target sheet at the preset labeling position with the defect label of the target sheet.

3. The machine vision-based sheet defect labeling method according to claim 2, wherein the determining a first conveying position corresponding to the target sheet comprises:

determining a third conveying position corresponding to the target sheet, wherein the third conveying position is a conveying position where the target sheet is located when the target sheet is conveyed to the preset defect inspection position for defect inspection;

determining a reference conveying distance corresponding to the target sheet, wherein the reference conveying distance is a conveying distance from the preset defect inspection position to the preset labeling position; and determining the first conveying position corresponding to the target sheet according to the third conveying position and the reference conveying distance.

4. The machine vision-based sheet defect labeling method according to claim 3, wherein each of the first conveying position, the third conveying position and the reference conveying distance is determined by a pulse output value output by an encoder associated with a reference drive shaft, and the reference drive shaft is capable of driving the target sheet to continue to be conveyed towards the preset labeling position after passing the preset defect inspection position.

5. The machine vision-based sheet defect labeling method according to claim 2, wherein the labeling, according to the first conveying position and the second conveying position, the defect of the target sheet at the preset labeling position with the defect label of the target sheet comprises:

determining, according to the first conveying position and the second conveying position, whether the defect of the target sheet material is conveyed to the preset labeling position; and in responding to inspecting that the defect of the target sheet is conveyed to the preset labeling position, labeling the defect of the target sheet at the preset labeling position in a preset labeling direction with the defect label of the target sheet to attach the defect label of the target sheet to the defect of the target sheet.

6. An electronic device, wherein the electronic device comprises:

at least one processor; and a memory communicatively connected to the at least one processor; wherein, the memory stores a computer program executable by the at least one processor, the computer program is executed by the at least one processor, to cause the at least one processor to execute:

performing a defect inspection on a target sheet conveyed to a preset defect inspection position, wherein the target sheet continues to be conveyed towards a preset labeling position after passing the preset defect inspection position by being conveyed;

determining a defect label of the target sheet when a defect is present in the target sheet, wherein the defect label carries defect information represented by a two-dimensional barcode symbol comprising discontinuous dots, wherein the two-dimensional barcode symbol is generated by using DotCode technology; and labeling the defect of the target sheet at the preset labeling position with the defect label of the target sheet;

wherein the at least one processor is caused to determine the defect label of the target sheet when the defect is present in the target sheet in the following manners:

receiving the defect information of the target sheet when the defect is present in the target sheet according to a preset receiving frequency, wherein the preset receiving frequency is configured according to an accuracy of labeling defects of sheets on a production line; and generating the defect label of the target sheet based on the defect information of the target sheet;

wherein the at least one processor is caused to generate the defect label of the target sheet based on the defect information of the target sheet in the following manners:

performing encoding based on the defect information of the target sheet to generate defect code content of the target sheet; and printing the defect code content of the target sheet on a label tape to obtain the defect label of the target sheet;

wherein the at least one processor is caused to perform encoding based on the defect information of the target sheet to generate defect code content of the target sheet in the following manners:

in response to that both the target sheet and an adjacent sheet have defects, generating the defect code content of the target sheet by performing encoding based on the defect information of the target sheet and defect information of the adjacent sheet, wherein the adjacent sheet is a sheet that is adjacent to the target sheet in position and has been conveyed and reached the preset defect inspection position before the target sheet is conveyed and reaches the preset defect inspection position, and continues to be conveyed towards the preset labeling position after passing the preset defect inspection position; and in response to that defects are present in a plurality of sheets in adjacent areas, merging defects of a plurality of adjacent sheets, and performing code printing and labeling for the plurality of adjacent sheets in one time, wherein the defect code content of the target sheet comprises the defect information of the target sheet and defect information of at least one of the plurality of adjacent sheet, the defect information comprises position information of the defect, and the position information of the defect is a coordinate position relative to the target sheet.

7. The electronic device according to claim 6, wherein the at least one processor is caused to labeling the defect of the target sheet at the preset labeling position with the defect label of the target sheet in the following manners:

determining a first conveying position corresponding to the target sheet, wherein the first conveying position is an expected conveying position corresponding to the target sheet when the target sheet is conveyed to the preset labeling position;

determining a second conveying position corresponding to the target sheet, wherein the second conveying position is a real-time conveying position of the target sheet conveyed from the preset defect inspection position towards the preset labeling position; and labeling, according to the first conveying position and the second conveying position, the defect of the target sheet at the preset labeling position with the defect label of the target sheet.

8. The electronic device according to claim 7, wherein the at least one processor is caused to determine a first conveying position corresponding to the target sheet in the following manners:

determining a third conveying position corresponding to the target sheet, wherein the third conveying position is a conveying position where the target sheet is located when the target sheet is conveyed to the preset defect inspection position for defect inspection;

determining a reference conveying distance corresponding to the target sheet, wherein the reference conveying distance is a conveying distance from the preset defect inspection position to the preset labeling position; and determining the first conveying position corresponding to the target sheet according to the third conveying position and the reference conveying distance.

9. The electronic device according to claim 8, wherein each of the first conveying position, the third conveying position and the reference conveying distance is determined by a pulse output value output by an encoder associated with a reference drive shaft, and the reference drive shaft is capable of driving the target sheet to continue to be conveyed towards the preset labeling position after passing the preset defect inspection position.

10. The electronic device according to claim 7, wherein the at least one processor is caused to label, according to the first conveying position and the second conveying position, the defect of the target sheet at the preset labeling position with the defect label of the target sheet in the following manners:

determining, according to the first conveying position and the second conveying position, whether the defect of the target sheet material is conveyed to the preset labeling position; and in responding to inspecting that the defect of the target sheet is conveyed to the preset labeling position, labeling the defect of the target sheet at the preset labeling position in a preset labeling direction with the defect label of the target sheet to attach the defect label of the target sheet to the defect of the target sheet.

11. A non-transitory computer-readable storage medium, storing a computer instruction, wherein the computer instruction is used to cause a processor to implement:

performing a defect inspection on a target sheet conveyed to a preset defect inspection position, wherein the target sheet continues to be conveyed towards a preset labeling position after passing the preset defect inspection position by being conveyed;

determining a defect label of the target sheet when a defect is present in the target sheet, wherein the defect label carries defect information represented by a two-dimensional barcode symbol comprising discontinuous dots, wherein the two-dimensional barcode symbol is generated by using DotCode technology; and labeling the defect of the target sheet at the preset labeling position with the defect label of the target sheet;

wherein the determining a defect label of the target sheet when a defect is present in the target sheet comprises:

receiving the defect information of the target sheet when the defect is present in the target sheet according to a preset receiving frequency, wherein the preset receiving frequency is configured according to an accuracy of labeling defects of sheets on a production line; and generating the defect label of the target sheet based on the defect information of the target sheet;

wherein the generating the defect label of the target sheet based on the defect information of the target sheet comprises:

performing encoding based on the defect information of the target sheet to generate defect code content of the target sheet; and printing the defect code content of the target sheet on a label tape to obtain the defect label of the target sheet;

wherein the performing encoding based on the defect information of the target sheet to generate defect code content of the target sheet comprises:

in response to that both the target sheet and an adjacent sheet have defects, generating the defect code content of the target sheet by performing encoding based on the defect information of the target sheet and defect information of the adjacent sheet, wherein the adjacent sheet is a sheet that is adjacent to the target sheet in position and has been conveyed and reached the preset defect inspection position before the target sheet is conveyed and reaches the preset defect inspection position, and continues to be conveyed towards the preset labeling position after passing the preset defect inspection position; and in response to that defects are present in a plurality of sheets in adjacent areas, merging defects of a plurality of adjacent sheets, and performing code printing and labeling for the plurality of adjacent sheets in one time, wherein the defect code content of the target sheet comprises the defect information of the target sheet and defect information of at least one of the plurality of adjacent sheet, the defect information comprises position information of the defect, and the position information of the defect is a coordinate position relative to the target sheet.

12. The non-transitory computer-readable storage medium according to claim 11, wherein the at least one processor is caused to labeling the defect of the target sheet at the preset labeling position with the defect label of the target sheet in the following manners:

determining a first conveying position corresponding to the target sheet, wherein the first conveying position is an expected conveying position corresponding to the target sheet when the target sheet is conveyed to the preset labeling position;

determining a second conveying position corresponding to the target sheet, wherein the second conveying position is a real-time conveying position of the target sheet conveyed from the preset defect inspection position towards the preset labeling position; and labeling, according to the first conveying position and the second conveying position, the defect of the target sheet at the preset labeling position with the defect label of the target sheet.

13. The non-transitory computer-readable storage medium according to claim 12, wherein the at least one processor is caused to determine a first conveying position corresponding to the target sheet in the following manners:

determining a third conveying position corresponding to the target sheet, wherein the third conveying position is a conveying position where the target sheet is located when the target sheet is conveyed to the preset defect inspection position for defect inspection;

determining a reference conveying distance corresponding to the target sheet, wherein the reference conveying distance is a conveying distance from the preset defect inspection position to the preset labeling position; and determining the first conveying position corresponding to the target sheet according to the third conveying position and the reference conveying distance.

14. The non-transitory computer-readable storage medium according to claim 12, wherein the at least one processor is caused to label, according to the first conveying position and the second conveying position, the defect of the target sheet at the preset labeling position with the defect label of the target sheet in the following manners:

determining, according to the first conveying position and the second conveying position, whether the defect of the target sheet material is conveyed to the preset labeling position; and in responding to inspecting that the defect of the target sheet is conveyed to the preset labeling position, labeling the defect of the target sheet at the preset labeling position in a preset labeling direction with the defect label of the target sheet to attach the defect label of the target sheet to the defect of the target sheet.

* * * * *